United States Patent [19]

Winslow et al.

[11] Patent Number: 4,645,711

[45] Date of Patent: Feb. 24, 1987

[54] REMOVABLE PRESSURE-SENSITIVE ADHESIVE TAPE

[75] Inventors: Louis E. Winslow, Stillwater, Minn.; Richard E. Bennett, Hudson, Wis.; Thomas S. Overstreet, St. Paul, Minn.

[73] Assignee: Minnesota Mining and Manufacturing Company, St. Paul, Minn.

[21] Appl. No.: 769,423

[22] Filed: Aug. 26, 1985

[51] Int. Cl.$^4$ ............................ C09J 7/02; B05D 5/10
[52] U.S. Cl. ...................................... 428/355; 156/327; 156/332; 427/208.4; 428/514
[58] Field of Search ............... 428/343, 355, 514, 352; 524/398, 815; 427/208.4; 156/327, 332

[56] References Cited

U.S. PATENT DOCUMENTS

| Re. 24,906 | 12/1960 | Ulrich | 428/343 |
|---|---|---|---|
| 3,008,850 | 11/1961 | Ulrich | 428/352 |
| 3,740,366 | 6/1973 | Sanderson et al. | 524/398 |
| 3,922,464 | 11/1975 | Silver et al. | 428/355 |
| 3,931,087 | 1/1976 | Baatz et al. | 524/815 |
| 4,012,560 | 3/1977 | Baatz et al. | 428/514 X |
| 4,077,926 | 3/1978 | Sanderson et al. | 428/355 X |
| 4,091,162 | 5/1978 | Henderson et al. | 428/327 |
| 4,110,290 | 8/1978 | Mori et al. | 428/520 X |
| 4,418,120 | 11/1983 | Kealy et al. | 428/343 |

OTHER PUBLICATIONS

D. Satas, Handbook of Pressure-Sensitive Adhesive Technology, Van Nostrand Reinhold Co., N.Y., 1982, pp. 203-207.

M. J. Jones, "Elastomers and Resin Modifiers for Water-Based Adhesives", *Proceedings Today's Technology*, Holiday Inn O'Hare, Rosemont, IL., Jun. 23-24, 1981, pp. 85, 88, 89, 106-108.

*Primary Examiner*—Thomas J. Herbert
*Attorney, Agent, or Firm*—Donald M. Sell; James A. Smith; Richard E. Brink

[57] ABSTRACT

The pressure-sensitive adhesive layer of the novel tape, like that of Silver U.S. Pat. No. 3,922,464, comprises a copolymer of alkyl acrylate such as isooctyl acrylate and a small amount of emulsifier monomer. The novel tape differs from that of Silver by incorporating tackifier resin, thus better resisting lifting forces at elevated temperatures while also being cleanly removable.

11 Claims, No Drawings

REMOVABLE PRESSURE-SENSITIVE ADHESIVE TAPE

FIELD OF THE INVENTION

The invention concerns pressure-sensitive adhesive tapes which usually are slit to narrow widths and then wound upon themselves for storage and shipment. Such tapes are originally produced in wide widths, and the term "tape" encompasses such wide widths. The invention specifically concerns removable pressure-sensitive adhesive tapes such as masking tapes, weatherstripping tapes, label tapes, and protective plating tapes.

BACKGROUND ART

The problem of developing a masking tape having good heat resistance is discussed in a general way in Satas: "Handbook of Pressure-Sensitive Adhesive Technology", Van Nostrand Reinhold Co., 1982, pages 203-207. After noting that "conventional natural rubber adhesives" do not have the required temperature resistance for a masking tape, the handbook says: "To impart the required degree of heat resistance to the adhesive, it is usual to effect a degree of crosslinking to the natural rubber. We have seen earlier that the tack and adhesion of pressure-sensitive adhesives depend upon the viscoelastic properties of the rubber-resin blend. Consequently, the degree of crosslinking has to be carefully controlled; if the degree of curing is too high, then the adhesive will lose its ability to deform readily and hence wet the surface to which it is being applied, but it has to be sufficiently cured to have resistance to the paint solvent, and also not to be softened too much by the stoving cycle" (page 203).

As pointed out in U.S. Pat. No. 3,922,464 (Silver et al.): "Early pressure-sensitive adhesives were based on organic solvent solutions of natural or synthetic rubber tackified by some type of resinous material. These so called 'rubber-resin' adhesives are still widely used in masking tape, one major reason being that they can be formulated so as not to display adhesion buildup, i.e., their adhesion to the membrane does not increase to the point where the tape cannot be removed cleanly, even after exposure to the heat of a drying or curing oven." (col. 1, lines 40-48). The Silver patent then alludes to problems of batch-to-batch consistency of rubber-resin adhesives and to staining problems, indicating that these problems are avoided by a wholly synthetic adhesive system based on a copolymer of (a) vinyl monomer such as iso-octyl acrylate, (b) a small amount of vinyl-unsaturated, homopolymerizable emulsifier monomer which is a surfactant such as sodium-2-sulfoethylmethacrylate, and preferably (c) a small amount of zwitterion monomer having a free radically polymerizable unsaturated group. The Silver patent also recommends that the adhesive layer contain a small amount of external emulsifier such as sodium dodecyl benzene sulfonate.

The Silver patent reports "the absence of adhesion increase, or 'buildup' when tape made with such an adhesive is applied to an enameled or lacquered surface. The adhesion stability is observed even when the tape, after application, is subjected to temperatures of 250° F. (about 120° C.) for 1 hour or for longer periods of time at lower temperatures . . . " (col. 3, lines 2-10). Preferred tapes of the Silver patent have been cleanly removed from enameled or lacquered surfaces after one hour at 150° C., a temperature commonly used in automotive painting.

In order to reduce solvent emissions, the automotive industry is extensively converting to basecoat/clearcoat paint systems (usually acrylic enamel systems) to which presure-sensitive adhesives are less adherent. Preferred tapes of the Silver patent would not remain well adhered at 150° C. when subjected to the sort of lifting forces that are encountered when a masking tape is applied to a curved surface and/or is used to hold an apron. Another widely used automotive paint involving lifting problems at 150° C. of the Silver tapes and other prior masking tapes is "50J" acrylic enamel of Ford Motor Co.

Both the pressure-sensitive adhesive of the above-cited Silver patent and that of U.S. Pat. No. Re. 24,906 (Ulrich) are copolymers of nontertiary alkyl acrylates such as 2-ethylhexyl acrylate, but the Ulrich adhesive is a copolymer of such an acrylate and a small proportion of a highly polar monomer such as acrylic acid which produces adhesion buildup. Because of this, the Ulrich adhesive is not suitable for masking tapes, even though a continuation-in-part of the Ulrich reissue patent, U.S. Pat. No. 3,008,850, which concerns acrylates copolymerized with small proportions of acrylonitrile or methacrylonitrile, reports that a strip of the pressure-sensitive adhesive tape of Example 1 was cleanly stripped from an enameled automotive panel after 30 minutes at 121° C.

U.S. Pat. No. 4,418,120 (Kealy et al.) states: "It has long been recognized that adhesives that consist essentially of a copolymer of alkyl acrylate and a minor proportion of copolymerizable monomer such as acrylic acid do not require a tackifying resin and are able to resist aging; thus, such adhesives have advantages over the earlier and more traditional rubber-resin adhesives; cf. Ulrich U.S. Pat. No. 24,906" (col. 1, lines 54-60). The Kealy patent concerns the need to improve both the adhesion and the heat resistance at 70° C. of such an acrylate:acrylic acid adhesive to low energy surfaces, and does this by employing a tackifying resin for better adhesion and by crosslinking the tackified pressure-sensitive adhesive for better heat resistance at 70° C. The Kealy patent does not suggest that its tapes would be removable. Neither do other patents and publications which mention that tackifiers can be used with acrylate adhesives. For example, see U.S. Pat. Nos. 3,740,366 and 4,077,926 (Sanderson).

Also, see page 89 of Jones: "Elastomers and Resin Modifiers for Water-based Adhesives", *Proceeding Today's Technology*, Holiday Inn O'Hare, Rosemont, IL., June 23-24, 1981, which notes that copolymers of the Ulrich reissue patent "have typically been used without tackifying resins or with quite low levels" but that tackifying resins can "contribute significantly to probe tack, peel and quick stick."

U.S. Pat. Nos. 3,931,087 and 4,012,560 (Baatz et al.) concern pressure-sensitive adhesive tape based on a copolymer like those of the above-cited Silver patent except employing a specific sulfonic acid as the emulsifier monomer. The specification of each of the Baatz patents closes with a paragraph which says that the invention contemplates the use of various modifiers in the pressure-sensitive adhesive resins, including tackifiers. The function of those tackifiers is not mentioned.

DISCLOSURE OF INVENTION

The invention provides what is believed to be the first nonstaining automotive masking tape that reliably resists typical lifting forces at 150° C. from automotive paint and yet can reliably be stripped off cleanly from automotive paint after one hour at 150° C. in the "Removal Test" described below. By "typical lifting forces" are meant those simulated in the "Curved Panel Lifting Test at 150° C." described below.

The novel tape is similar to that of the Silver patent in that it comprises a backing sheet carrying a layer of pressure-sensitive adhesive which comprises a copolymer of monomers comprising (a) from 95 to 99.8 parts by weight of at least one terminally unsaturated vinyl monomer, 60 to 100 weight percent of said vinyl monomer being selected from the class of nontertiary alkyl acrylates wherein each alkyl group has at least half of its carbon atoms in a single chain and the average length of the alkyl chain is at least 4 and not more than 12, and (b) from 0.2 to 5 parts by weight of at least one vinyl-unsaturated, homopolymerizable emulsifier monomer which is a surfactant having both a hydrophobic and a hydrophilic moiety, contains at least 5 but not more than 40 carbon atoms, and is water-dispersible, the total parts by weight of (a) plus (b) being 100. The novel tape differs from that of the Silver patent in that its layer of pressure-sensitive adhesive comprises from 5 to 50% by weight of tackifier resin selected from at least one of (a) hydrogenated rosin ester, (b) polyterpene, (c) polymerized alkyl styrene, and (d) polymerized petroleum-derived monomer resin. Preferably the tackifier resin comprises from 10 to 40% by weight of the pressure-sensitive adhesive layer, becuase when below 10%, the tape is less likely to pass the Curved Panel Lifting Test at 150° C., and when above 40%, the tape is less likely to be stripped off cleanly.

Specific tackifier resin dispersions which have been shown to be useful in the invention are:

Hydrogenated rosin esters

Resin A

Phthalate ester of technical hydroabietyl alcohol, having a ring and ball softening point of 63° C. and an acid number of 8.

Resin C

Glycerol ester of highly stabilized rosin, having a ring and ball softening point of 82° C. and an acid number of 9.

Resin D

Pentaerythritol ester of hydrogenated rosin, having a ring and ball softening point of 104° C. and an acid number of 12.

Polyterpenes

Resin B

Pale-colored, inert, low-molecular-weight, thermoplastic hydrocarbon resin produced from the terpene monomer, alpha-pinene, having a ring and ball softening point of 112°–118° C.

Polymerized alkyl styrenes

Resin E

Water-white, highly color-stable, nonpolar, low-molecular-weight, thermoplastic hydrocarbon polymer derived largely from alpha-methylstyrene.

Polymerized petroleum-derived monomer resins

Resin F

Light-color, thermoplastic, low-molecular-weight, petroleum-derived monomer hydrocarbon resin derived largely from mixed monomers of petroleum origin.

Preferably the amount of the emulsifier monomer (b) used in making the pressure-sensitive adhesive of the novel tape is from 1 to 4 parts by weight. Below one part, the tape would be less likely to pass the Removal Test. Above 4 parts might involve polymerization problems. Preferred as the emulsifier monomer (b) is a monovalent salt of a styrene sulfonate such as sodium styrene sulfonate. As compared to emulsifier monomers named in the Silver patent, a monovalent salt of a styrene sulfonate more reliably produces substantially coagulum-free latices; both the latices and polymers produced therefrom tend to have greater hydrolytic stability; and latices of higher solids can be obtained which are easier to coat. By substantially coagulum-free is meant a latex which neither hangs up on a stirrer nor prematurely plugs up a filter.

The Silver patent teaches the desirability of also employing "small amounts of external emulsifier, especially where short chain emulsifier monomers are used. Such emulsifiers, which are commonly employed in the preparation of many copolymer latices, assist in initial suspension of the monomeric reactants and tend to result in a more homogeneous appearing emulsion than when they are omitted" (col. 8, lines 39–48). While also not needed in the present invention, at least 0.05 weight percent of external emulsifier would be preferred in commercial production for the same reason. Preferably the external emulsifier is noncationic.

Also applicable to the present invention are the following teachings from the Silver patent: "The acrylic acid esters useful in the practice of this invention are the esters of alcohols which, on a mole basis contain an average of more than 4 to not more than 12 carbon atoms, preferably from 6 to 12 carbon atoms, the majority of the esters being derived from alcohols containing 4–12 carbon atoms. Examples of suitable esters are the acrylic acid esters of non-tertiary alcohols such as: 2-methylbutanol, 3-methylbutanol, 2-ethyl-butanol, 4-methylpentanol, 2-propyl-pentanol, n-hexanol, 2-methylhexanol, 4-methylhexanol, 2-hexanol, 2-ethylhexanol, 4-ethylhexanol, 4-methyl-2-pentanol, 2,3,4-triethylhexanol, 2-ethyl-3-methylhexanol, 2-heptanol, 3-heptanol, 3-methylheptanol, 2-ethylheptanol, 2-methyl-4-ethylheptanol, n-octanol, isooctanol, n-decanol, n-dodecanol, 10-chloro-decanol, 6-methoxyhexanol, etc., and mixtures thereof.

"If the average number of carbon atoms in the longest alkyl chain of the alcohols from which the acrylate esters are derived does not exceed 4, the adhesive tends to be harsh, raspy, and difficult to adhere quickly. If, however, at least 70% of the terminally unsaturated vinyl monomer is a suitable acrylate, short chain methacrylate monomers can be incorporated. If the average number of carbon atoms in the longest alkyl chain exceeds 12, the adhesive tends to become waxy and lack sufficient adhesion.

"For various reasons it may be desirable to incorporate, as part of the terminally unsaturated vinyl monomeric portion of the adhesive systems, any of several modifying comonomers which are not emulsifier monomers. For example, acrylonitrile imparts firmness and solvent resistance, styrene and alpha-methyl styrene impart firmness and improve peel adhesion, t-butyl-styrene improves tack, methylmethacrylate makes the adhesive firmer, octyl vinyl ether softens the adhesive, vinyl acetate improves adhesion to certain plastic surfaces, etc." (Col. 3, line 34, through col. 4, line 2).

Unlike the adhesives of all but one of the Silver patent examples, zwitterion monomer preferably is not used in making tapes of the invention because zwitterion emulsifier monomers tend to be expensive to make, and most of the zwitterion emulsifier monomers used in the Silver examples are not currently commercially available. Furthermore, at only the 2% weight level used in most of the Silver examples, a zwitterion emulsifier monomer might raise the price of a tape above what potential users would be willing to pay. The objectives of the invention are readily achieved without any need for zwitterion monomer.

Testing

Before carrying out the tests described below, the tape should be held at 22° C. and 50% relative humidity for at least 24 hours and preferably more than 48 hours.

Curved Panel Lifting Test at 150° C.

Used in this test is an aluminum panel having a radius of curvature of 23 cm and a length of 35.5 cm in the curved direction. An automotive paint covers the convex surface of the panel. In order to provide a rigorous test, the paint preferably is one to which masking tapes are difficultly adherent, e.g., an automotive basecoat/clearcoat (BC/CC) acrylic enamel paint system or the automotive "50J" acrylic enamel paint of Ford Motor Co.

Tapes to be tested have a backing sheet commonly used in masking tapes, namely a creped paper having a basis weight of 30 lbs. per papermaker's ream (about 50 g/m$^2$) and saturated with an acrylic latex. A latex of the pressure-sensitive adhesive to be evaluated is knife-coated onto one face of the backing sheet using a 0.1 mm orifice, allowed to dry at room temperature for about 10 minutes, and then dried in an oven for about 5 minutes at 95° C. The resulting tapes are cut to 1×14 inches (2.54×35 cm). A 2×12 inches (5.08×30 cm) strip of nonadhesive masking paper (such as is used for automotive paint aprons) is applied to cover 0.5 inch (1.27 cm) of the adhesive layer except for one inch (2.5 cm) at each end of the tape. This assembly is hand applied to the aluminum panel in its curved direction, using the uncovered 0.5 inch (1.27 cm) of the adhesive layer to adhere it to the painted surface.

The assembly-bearing panel is then put into an air-circulating oven at 150° C. for 10 minutes, allowed to cool, and then examined for failures. A rating of "pass" means no lifting has occurred. Any lifting at either end of the strip is noted as "end failure", and the total length of tape which has lifted is noted. Any lifting along the length of the strip is noted as "edge lifting", and the cumulative lengths over which edge lifting is noted is reported in % of the total length of the strip or strips tested.

Removal Test

Used in this test is a tin-plate panel, the test surface of which has a white, glossy, stain-resistant acrylic enamel paint (E. I. duPont 963-AM-263), an automotive paint noted for difficult removability of masking tape, being far more resistant in this respect than either the basecoat/clearcoat paint system or the "50J" paint preferred for the Curved Panel Lifting Test.

Tapes prepared as in the Curved Panel Lifting Test are cut to 0.5×4 inches (1.27×10.16 cm) and adhered at room temperature by their adhesives to the test surface, followed by two passes of a 4.5-pound (2-kg) rubber-coated metal roller. After one hour in an air-circulating oven at either 121° C. or 150° C., the tape is peeled back at an angle of 45° at an approximate rate of 1.9 m/min., after which the panel is removed from the oven and examined. A nontacky deposit is reported as "R" for "residue". Tapes experiencing up to 100% residue are considered to be marginally acceptable. When there is a tacky deposit, the tape is examined to determine whether the adhesive split cohesively, reported as "S", or failed adhesively from the backing, reported as "A". Both are unacceptable, except that tapes which leave a deposit only at the start of the peel (up to 5%) are considered to be acceptable.

Any tape having a value of 0 in the Removal Test would leave no residue if the test surface were either the basecoat/clearcoat paint system or the "50J" paint preferred for the Curved Panel Lifting Test.

Copolymers used in making representative tapes of the invention include:

Acrylic Copolymer A

A split-resin flask of 2000 ml capacity was fitted with a variable speed agitator, condensor, purging tube for introducing nitrogen, and a recording controller. The following materials were added to the flask while purging the flask with nitrogen:

|  | grams |
| --- | --- |
| Deionized water | 479.6 |
| Sodium bicarbonate | 0.48 |
| Sodium dodecyl benzene sulfonate | 1.18 |
| Sodium styrene sulfonate | 15.68 |
| Isooctyl acrylate | 329.21 |
| N—tert-octylacrylamide | 47.03 |

The solid N-tert-octylacrylamide was dissolved in the isooctyl acrylate before adding to the flask. The nitrogen purge was continued until the end of the run. The flask and its contents were heated to 40° C., at which temperature a first initiator charge of 0.24 g of potassium persulfate and 0.08 g of sodium meta-bisulfate was added.

A change in color of the emulsion indicated the start of polymerization. The temperature was held near 40° C. by cooling and heating during the remaining period of reaction. 1.6 ml of 5% aqueous solution of sodium meta-bisulfate was added four hours after the first initiator charge, and 2.4 ml of a 5% aqueous solution of sodium meta-bisulfate and 2.4 ml of a 5% aqueous solution of potassium persulfate were added 7 hours after the first initiator charge. The emulsion was heated another 7½ hours to complete polymerization.

Solids—44.4%
pH—8.0

Viscosity—51 cps, Brookfield #1 spindle, 30 rpm.

ACRYLIC COPOLYMER B

To a 5000 ml split-resin flask equipped as in Example 1 were added the following:

| | |
|---|---|
| Deionized water | 1606.0 |
| Sodium bicarbonate | 2.4 |
| Sodium styrene sulfonate | 20.0 |
| Isooctyl acrylate | 1706.8 |
| N—tert-octylacrylamide | 240.0 |
| Sodium dodecyl benzene sulfonate | 6.0 |

The flask and its contents were purged with nitrogen while stirring and heating to 40° C., and a first initiator charge of 1.2 g potassium persulfate and 0.4 g sodium meta-bisulfite was added. Polymerization started in about ½ hour. The temperature was held at 40° C. by cooling and heating as required during polymerization. 8 ml of a 5% aqueous solution of sodium meta-bisulfite was added 5 hours after the first initiator charge, and 12 ml of a 5% aqueous solution of sodium meta-bisulfite and 12 ml of a 5% aqueous solution of potassium persulfate were added 7 hours after the first initiator charge. The emulsion was heated another 9 hours to complete the polymerization.

Solids—54.8%
pH—8.77
Viscosity—1348 cps, Brookfield #3 spindle, 30 rpm.

ACRYLIC COPOLYMER C

A split-resin flask of 1000 ml capacity was fitted with a variable speed agitator, condenser, purging tube for introducing nitrogen, and a recording controller. The following materials were added to the flask while purging the flask with nitrogen:

| | Grams |
|---|---|
| Deionized water | 440 |
| Sodium dodecyl benzene sulfonate | 0.29 |

| | Grams |
|---|---|
| 1,1-Dimethyl-1-(2-hydroxydecyl)amine methacrylimide | 11.2 |
| Isononyl acrylate | 476 |
| N—tert-octylacrylamide | 67.2 |
| 1% Sol. of tert-dodecyl mercaptan in isononyl acrylate | 7.09 |
| 0.22% Sol. of FeSO$_4$ in water | 1.25 |
| Potassium salt of sulfopropylmethacrylate | 5.60 |

The solid N-tert-octylacylamide and the methacrylimide were dissolved in the isononyl acrylate before adding to the flask to which the deionized water, sulfopropylmethacrylate, and sodium dodecyl benzene sulfonate had previously been added. A nitrogen purge was continued until the end of the run. The flask and its contents were heated to 40° C., at which time the solution of FeSO$_4$ was added, followed by addition of the mercaptan solution, after which 0.68 g of potassium persulfate and 0.34 g of sodium meta-bisulfite were added.

A change in color of the emulsion indicated the start of polymerization. The temperature was held near 40° C. by cooling and heating during the remaining period of reaction. The reaction was continued for four hours and twelve minutes. After this time, solids approached theoretical and reaction was judged to be essentially complete.

Solids—56.1%
pH—6.18
Viscosity—1520 cps, Brookfield #3 Spindle 30 rpm

ACRYLIC COPOLYMERS D-L

Acrylic Copolymers D-L were prepared using the same procedure as used for preparing Acrylic Copolymer A and are listed in Table I which gives parts by weight of each monomer charged.

TABLE I

| acrylic copolymer | A | B | C | D | E | F | G | H | I | J | K | L |
|---|---|---|---|---|---|---|---|---|---|---|---|---|
| isooctyl acrylate | 84.0 | 86.8 | | 87.0 | 87.0 | | | 87.0 | 87.0 | 93.5 | 86.0 | |
| 2-ethylhexyl acrylate | | | | | | 89.0 | | | | | | |
| isobutyl acrylate | | | | | | | 98.5 | | | | 12.0 | |
| isononyl acrylate | | | 85.0 | | | | | | | | | 98.5 |
| N—tert-octylacrylamide | 12.0 | 12.2 | 12.0 | 12.0 | 12.0 | | | | 12.0 | | | |
| styrene | | | | | | | 10.0 | 10.0 | | 5.0 | | |
| 1,1-dimethyl-1-(2-hydroxydecyl)-amine methacrylimide | | | 2.0 | | | | | 2.0 | | | | |
| sodium styrene sulfonate | 4.0 | 1.0 | | | | | | | | | 1.5 | 2.0 |
| sodium salt of 2-sulfoethylmethacrylate | | | | 1.0 | | | | 1.0 | | | | 1.5 |
| sodium salt of 2-acrylo-amido-2-methylpropane sulfonate | | | | | 1.0 | | | | | | | |
| potassium salt of sulfopropylmethacrylate | | | 1.0 | | | | | 1.5 | 1.0 | | | |
| N—(3-sulfopropyl)-N—methacryloxy-ethyl-N,N—dimethyl-ammonium betaine | | | | | | | 1.0 | | | | | |

In the following examples, all parts are by weight except as noted.

EXAMPLE 1

To the dispersion of Acrylic Copolymer A was added the above-identified Resin A dispersion in an amount comprising 5% by weight of solids. The mixture was blended by hand with a spatula for about fifteen seconds and then applied to biaxially oriented poly(ethyleneterephthalate) film backing (38-micrometer thickness) via a knife-over-web applicator using a 102-micrometer orifice. The coating was allowed to air dry for about ten minutes and then in a forced air oven at 104° C. for five additional minutes. The dried, coated tape was removed from the oven and covered with polyvinylchloride liner until subjected to testing.

EXAMPLES 2-140

Additional tapes were prepared as in Example 1 except as indicated in Table II. Exammples C-1 through C-12 at the end of the table are comparative.

Results of testing the tapes of Examples 1-140 and C-1 through C-12 are reported in Table III.

TABLE II

| Example | Acrylic Copolymer | Solids | Resin | Solids |
|---|---|---|---|---|
| 1 | A | 95 | A | 5 |
| 2 | A | 90 | A | 10 |
| 3 | A | 80 | A | 20 |
| 4 | A | 70 | A | 30 |
| 5 | A | 60 | A | 40 |
| 6 | B | 90 | A | 10 |
| 7 | B | 80 | A | 20 |
| 8 | B | 70 | A | 30 |
| 9 | B | 60 | A | 40 |
| 10 | C | 90 | A | 10 |
| 11 | C | 80 | A | 20 |
| 12 | C | 70 | A | 30 |
| 13 | C | 60 | A | 40 |
| 14 | D | 90 | A | 10 |
| 15 | D | 80 | A | 20 |
| 16 | D | 70 | A | 30 |
| 17 | D | 60 | A | 40 |
| 18 | E | 90 | A | 10 |
| 19 | E | 80 | A | 20 |
| 20 | E | 70 | A | 30 |
| 21 | E | 60 | A | 40 |
| 22 | F | 90 | A | 10 |
| 23 | F | 80 | A | 20 |
| 24 | F | 70 | A | 30 |
| 25 | F | 60 | A | 40 |
| 26 | G | 90 | A | 10 |
| 27 | G | 80 | A | 20 |
| 28 | G | 70 | A | 30 |
| 29 | G | 60 | A | 40 |
| 30 | H | 90 | A | 10 |
| 31 | H | 80 | A | 20 |
| 32 | H | 70 | A | 30 |
| 33 | H | 60 | A | 40 |
| 34 | I | 90 | A | 10 |
| 35 | I | 80 | A | 20 |
| 36 | I | 70 | A | 30 |
| 37 | I | 60 | A | 40 |
| 38 | H | 90 | A | 10 |
| 39 | J | 80 | A | 20 |
| 40 | J | 70 | A | 30 |
| 41 | J | 60 | A | 40 |
| 42 | K | 90 | A | 10 |
| 43 | K | 80 | A | 20 |
| 44 | K | 70 | A | 30 |
| 45 | K | 60 | A | 40 |
| 46 | L | 90 | A | 10 |
| 47 | L | 80 | A | 20 |
| 48 | L | 70 | A | 30 |
| 49 | L | 60 | A | 40 |
| 50 | A | 95 | B | 5 |
| 51 | A | 90 | B | 10 |
| 52 | A | 80 | B | 20 |
| 53 | A | 70 | B | 30 |
| 54 | A | 60 | B | 40 |
| 55 | B | 90 | B | 10 |
| 56 | B | 80 | B | 20 |
| 57 | B | 70 | B | 30 |
| 58 | B | 60 | B | 40 |
| 59 | C | 90 | B | 10 |
| 60 | C | 80 | B | 20 |
| 61 | C | 70 | B | 30 |
| 62 | C | 60 | B | 40 |
| 63 | D | 90 | B | 10 |
| 64 | D | 80 | B | 20 |
| 65 | D | 70 | B | 30 |
| 66 | D | 60 | B | 40 |
| 67 | E | 90 | B | 10 |
| 68 | E | 80 | B | 20 |
| 69 | E | 70 | B | 30 |
| 70 | E | 60 | B | 40 |
| 71 | F | 90 | B | 10 |
| 72 | F | 80 | B | 20 |
| 73 | F | 70 | B | 30 |
| 74 | F | 60 | B | 40 |
| 75 | G | 90 | B | 10 |
| 76 | G | 80 | B | 20 |
| 77 | G | 70 | B | 30 |
| 78 | G | 60 | B | 40 |
| 79 | H | 90 | B | 10 |
| 80 | H | 80 | B | 20 |
| 81 | H | 70 | B | 30 |
| 82 | H | 60 | B | 40 |
| 83 | I | 90 | B | 10 |
| 84 | I | 80 | B | 20 |
| 85 | I | 70 | B | 30 |
| 86 | I | 60 | B | 40 |
| 87 | J | 90 | B | 10 |
| 88 | J | 80 | B | 20 |
| 90 | J | 60 | B | 40 |
| 91 | K | 90 | B | 10 |
| 92 | K | 80 | B | 20 |
| 93 | K | 70 | B | 30 |
| 94 | K | 60 | B | 40 |
| 95 | L | 90 | B | 10 |
| 96 | L | 80 | B | 20 |
| 97 | L | 70 | B | 30 |
| 98 | L | 60 | B | 40 |
| 99 | A | 70 | A | 15 |
|   |   |   | B | 15 |
| 100 | A | 60 | A | 20 |
|   |   |   | B | 20 |
| 101 | B | 70 | A | 15 |
|   |   |   | B | 15 |
| 102 | B | 60 | A | 20 |
|   |   |   | B | 20 |
| 103 | C | 70 | A | 15 |
|   |   |   | B | 15 |
| 104 | C | 60 | A | 20 |
|   |   |   | B | 20 |
| 105 | D | 70 | A | 15 |
|   |   |   | B | 15 |
| 106 | D | 60 | A | 20 |
|   |   |   | B | 20 |
| 107 | E | 70 | A | 15 |
|   |   |   | B | 15 |
| 108 | E | 60 | A | 20 |
|   |   |   | B | 20 |
| 109 | F | 70 | A | 15 |
|   |   |   | B | 15 |
| 110 | F | 60 | A | 20 |
|   |   |   | B | 20 |
| 111 | G | 70 | A | 15 |
|   |   |   | B | 15 |
| 112 | G | 60 | A | 20 |
|   |   |   | B | 20 |
| 113 | H | 70 | A | 15 |
|   |   |   | B | 15 |
| 114 | H | 60 | A | 20 |
|   |   |   | B | 20 |
| 115 | I | 70 | A | 15 |
|   |   |   | B | 15 |
| 116 | I | 60 | A | 20 |

TABLE II-continued

| Example | Acrylic Copolymer | Solids | Resin | Solids |
|---|---|---|---|---|
| | | | B | 20 |
| 117 | J | 70 | A | 15 |
| | | | B | 15 |
| 118 | J | 60 | A | 20 |
| | | | B | 20 |
| 119 | K | 70 | A | 15 |
| | | | B | 15 |
| 120 | K | 60 | A | 20 |
| | | | B | 20 |
| 121 | L | 70 | A | 15 |
| | | | B | 15 |
| 122 | L | 60 | A | 20 |
| | | | B | 20 |
| 123 | B | 90 | C | 10 |
| 124 | B | 80 | C | 20 |
| 125 | B | 70 | C | 30 |
| 126 | B | 60 | C | 40 |
| 127 | B | 70 | A | 15 |
| | | | C | 15 |
| 128 | B | 60 | A | 20 |
| | | | C | 20 |
| 129 | B | 70 | B | 15 |
| | | | C | 15 |
| 130 | B | 60 | B | 20 |
| | | | C | 20 |
| 131 | A | 90 | D | 10 |
| 132 | A | 60 | D | 40 |
| 133 | A | 90 | E | 10 |
| 134 | A | 60 | E | 40 |
| 135 | A | 70 | A | 15 |
| | | | D | 15 |
| 136 | A | 60 | A | 20 |
| | | | D | 20 |
| 137 | A | 90 | F | 10 |
| 138 | A | 60 | F | 40 |
| 139 | A | 70 | A | 15 |
| | | | E | 15 |
| 140 | A | 60 | A | 20 |
| | | | E | 20 |
| C-1 | A | 100 | | 0 |
| C-2 | B | 100 | | 0 |
| C-3 | C | 100 | | 0 |
| C-4 | D | 100 | | 0 |
| C-5 | E | 100 | | 0 |
| C-6 | F | 100 | | 0 |
| C-7 | G | 100 | | 0 |
| C-8 | H | 100 | | 0 |
| C-9 | I | 100 | | 0 |
| C-10 | J | 100 | | 0 |
| C-11 | K | 100 | | 0 |
| C-12 | L | 100 | | 0 |

TABLE III

Curved Panel Lifting Test 10 Min at 150° C.

| Example | BC/CC Panel end failure (cm) | BC/CC Panel edge lifting | 50J Panel end failure (cm) | 50J Panel edge lifting | Removal Test 60 min @ 121° C. | Removal Test 60 min @ 150° C. |
|---|---|---|---|---|---|---|
| 1 | Pass | Pass | 0.6 | 1% | 0 | 50% R |
| 2 | Pass | Pass | Pass | Pass | 0 | 50% A; 50% R |
| 3 | Pass | Pass | Pass | Pass | 0 | 100% R |
| 4 | Pass | Pass | Pass | Pass | 0 | 100% R |
| 5 | Pass | Pass | Pass | Pass | 0 | 5% A; 95% R |
| 6 | Pass | Pass | — | — | — | 0 |
| 7 | Pass | Pass | — | — | — | 0 |
| 8 | Pass | Pass | — | — | — | 0 |
| 9 | Pass | Pass | — | — | — | 0 |
| 10 | 1.3 | 3% | — | — | 3%* | 100% R |
| 11 | Pass | Pass | — | — | 2%* | 100% R |
| 12 | Pass | Pass | — | — | 2%* | 100% R |
| 13 | Pass | Pass | — | — | 1%* | 100% R |
| 14 | Pass | Pass | Pass | 3% | 0 | 0 |
| 15 | Pass | Pass | 0.6 | Pass | 0 | 0 |
| 16 | Pass | Pass | Pass | Pass | 0 | 0 |
| 17 | Pass | Pass | 0.3 | Pass | 0 | 0 |
| 18 | Pass | Pass | Pass | Pass | 0 | 0 |
| 19 | 0.6 | Pass | 1.3 | Pass | 0 | 0 |
| 20 | Pass | Pass | Pass | Pass | 0 | 50% A |
| 21 | Pass | Pass | Pass | Pass | 0 | 50% A |
| 22 | Pass | Pass | — | — | 0 | 0 |
| 23 | 16 | Pass | — | — | 0 | 0 |
| 24 | 7.5 | 5% | — | — | 0 | 0 |
| 25 | Pass | Pass | — | — | 100% R | 100% R |
| 26 | 30 | 100% | — | — | 0 | 0 |
| 27 | 30 | 100% | — | — | 0 | 0 |
| 28 | 6.5 | 2% | — | — | 0 | 0 |
| 29 | Pass | Pass | — | — | 0 | 0 |
| 30 | 1.3 | 2% | — | — | 0 | 40% A |
| 31 | Pass | 5% | — | — | 0 | 40% R |
| 32 | Pass | Pass | — | — | 0 | 100% R |
| 33 | Pass | Pass | — | — | 0 | 100% R |
| 34 | Pass | Pass | 1.3 | 1% | 0 | 0 |
| 35 | Pass | Pass | 1.3 | Pass | 0 | 0 |
| 36 | Pass | Pass | Pass | Pass | 0 | 2%* |
| 37 | Pass | Pass | Pass | Pass | 0 | 5%* |
| 38 | 1.3 | Pass | — | — | 0 | 0 |
| 39 | Pass | Pass | — | — | 0 | 0 |
| 40 | Pass | Pass | — | — | 0 | 0 |
| 41 | Pass | Pass | — | — | 0 | 0 |
| 42 | 2.5 | Pass | — | — | 0 | 0 |
| 43 | Pass | Pass | — | — | 0 | 0 |
| 44 | Pass | Pass | — | — | 0 | 0 |
| 45 | Pass | Pass | — | — | 0 | 0 |

TABLE III-continued

| | Curved Panel Lifting Test 10 Min at 150° C. | | | | Removal Test | Removal Test |
|---|---|---|---|---|---|---|
| | BC/CC Panel | | 50J Panel | | | |
| Example | end failure (cm) | edge lifting | end failure (cm) | edge lifting | 60 min @ 121° C. | 60 min @ 150° C. |
| 46 | Pass | Pass | — | — | 0 | 7% A |
| 47 | Pass | 1% | — | — | 0 | 5%* |
| 48 | Pass | 3% | — | — | 100% R | 5%* |
| 49 | Pass | Pass | — | — | 100% R | 30% A |
| 50 | Pass | Pass | 1.3 | Pass | 0 | 50% R |
| 51 | Pass | Pass | Pass | Pass | 0 | 10% A |
| 52 | Pass | Pass | Pass | Pass | 0 | 100% R |
| 53 | 0.6 | Pass | Pass | Pass | 0 | 100% R |
| 54 | Pass | Pass | Pass | Pass | 0 | 100% R |
| 55 | 0.6 | 5% | — | — | — | 0 |
| 56 | Pass | 3% | — | — | — | 0 |
| 57 | 1.3 | 5% | — | — | — | 0 |
| 58 | 2.5 | Pass | — | — | — | 0 |
| 59 | 4 | 2% | — | — | 0 | 100% A |
| 60 | Pass | 3% | — | — | 75% R, 15% R | 100% A |
| 61 | Pass | 2% | — | — | 100% S | 100% A |
| 62 | Pass | Pass | — | — | 100% S | 100% A |
| 63 | 0.6 | 1% | 25 | Pass | 0 | 5%* |
| 64 | Pass | Pass | 14 | Pass | 0 | 2%* |
| 65 | Pass | Pass | Pass | Pass | 0 | 5%* |
| 66 | Pass | Pass | Pass | 3% | 0 | 50% A |
| 67 | Pass | Pass | 10 | 5% | 0 | 2%* |
| 68 | Pass | Pass | Pass | Pass | 0 | 1%* |
| 69 | Pass | Pass | Pass | Pass | 0 | 1%* |
| 70 | Pass | Pass | 1.3 | Pass | 0 | 5%* |
| 71 | 2.5 | 3% | — | — | 20% A | 100% A |
| 72 | 2 | 3% | — | — | 10% A | 100% A |
| 73 | 1.3 | Pass | — | — | 5%* | 100% A |
| 74 | Pass | Pass | — | — | 1%* | 100% A |
| 75 | 18 | Pass | — | — | 0 | 0 |
| 76 | 30 | 100% | — | — | 100% R | 0 |
| 77 | 30 | 100% | — | — | 100% R | 100% R |
| 78 | 30 | 100% | — | — | 5% A, 95% R | 100% R |
| 79 | 2.5 | 5% | — | — | 0 | 60% A, 40% R |
| 80 | 1.3 | 10% | — | — | 0 | 50% A, 50% R |
| 81 | Pass | 3% | — | — | 100% R | 100% R |
| 82 | Pass | Pass | — | — | 100% R | 50% A, 50% R |
| 83 | Pass | Pass | 6.5 | 5% | 0 | 2%* |
| 84 | Pass | Pass | 16 | Pass | 0 | 2%* |
| 85 | Pass | Pass | 3 | Pass | 0 | 2%* |
| 86 | Pass | Pass | Pass | Pass | 0 | 2%* |
| 87 | Pass | 3% | — | — | 0 | 0 |
| 88 | Pass | 2% | — | — | 0 | 0 |
| 89 | Pass | Pass | — | — | 1%* | 0 |
| 90 | Pass | Pass | — | — | 3%* | 0 |
| 91 | 9.5 | 5% | — | — | 0 | 0 |
| 92 | 7.5 | 5% | — | — | 0 | 0 |
| 93 | 5 | 10% | — | — | 0 | 0 |
| 94 | Pass | Pass | — | — | 0 | 100% A |
| 95 | 2 | Pass | — | — | 1%* | 5%* |
| 96 | 2.5 | Pass | — | — | 4%* | 10% A |
| 97 | Pass | Pass | — | — | 3%* | 80% A |
| 98 | Pass | Pass | — | — | 1%* | 80% A |
| 99 | Pass | Pass | Pass | Pass | 0 | 100% R |
| 100 | Pass | Pass | Pass | Pass | 0 | 4% A |
| 101 | Pass | Pass | — | — | — | 0 |
| 102 | Pass | Pass | — | — | — | 0 |
| 103 | Pass | Pass | — | — | 70% R | 100% R |
| 104 | Pass | Pass | — | — | 35% R | 100% R |
| 105 | Pass | Pass | Pass | Pass | 0 | 5%* |
| 106 | Pass | Pass | Pass | Pass | 0 | 7% A |
| 107 | Pass | Pass | Pass | Pass | 0 | 5%* |
| 108 | Pass | Pass | Pass | Pass | 1%* | 50% A |
| 109 | 2.5 | 2% | — | — | 0 | 40% A |
| 110 | Pass | Pass | — | — | 50% R | 20% A |
| 111 | 4 | Pass | — | — | 100% R | 100% R |
| 112 | Pass | Pass | — | — | 100% R | 100% R |
| 113 | Pass | Pass | — | — | 0 | 100% A |
| 114 | Pass | Pass | — | — | 0 | 100% A |
| 115 | Pass | Pass | Pass | Pass | 0 | 5%* |
| 116 | Pass | Pass | Pass | Pass | 0 | 5%* |
| 117 | Pass | Pass | — | — | 0 | 0 |
| 118 | Pass | Pass | — | — | 0 | 0 |
| 119 | Pass | Pass | — | — | 0 | 0 |
| 120 | Pass | Pass | — | — | 0 | 0 |
| 121 | Pass | Pass | — | — | 0 | 30% A |

TABLE III-continued

| | Curved Panel Lifting Test 10 Min at 150° C. | | | | Removal Test | Removal Test |
|---|---|---|---|---|---|---|
| | BC/CC Panel | | 50J Panel | | | |
| Example | end failure (cm) | edge lifting | end failure (cm) | edge lifting | 60 min @ 121° C. | 60 min @ 150° C. |
| 122 | Pass | Pass | — | — | 0 | 40% A |
| 123 | Pass | 10% | — | — | — | 0 |
| 124 | 1.3 | 5% | — | — | — | 0 |
| 125 | 6 | Pass | — | — | — | 0 |
| 126 | Pass | 2% | — | — | — | 0 |
| 127 | Pass | Pass | — | — | — | 0 |
| 128 | Pass | Pass | — | — | — | 0 |
| 129 | Pass | 5% | — | — | — | 0 |
| 130 | 2.5 | Pass | — | — | — | 0 |
| 131 | Pass | Pass | Pass | Pass | 0 | 0 |
| 132 | Pass | Pass | Pass | Pass | 0 | 0 |
| 133 | 2 | 10% | 1.3 | 10% | 0 | 100% R |
| 134 | 1.3 | 3% | Pass | 5% | 100% R | 100% R |
| 135 | Pass | Pass | Pass | Pass | 0 | 0 |
| 136 | Pass | Pass | Pass | Pass | 0 | 3%* |
| 137 | Pass | Pass | 0.6 | 3% | 3%* | 100% A |
| 138 | Pass | Pass | Pass | Pass | 100% R | 100% R |
| 139 | Pass | Pass | Pass | Pass | 2%* | 2%* |
| 140 | Pass | Pass | Pass | Pass | 1%* | 40% A |
| C-1 | Pass | Pass | — | — | — | 100% R |
| C-2 | 2.5 | 10% | — | — | — | 0 |
| C-3 | 0.6 | 10% | — | — | — | 0 |
| C-4 | Pass | Pass | — | — | — | 50% S |
| C-5 | Pass | Pass | — | — | — | 25% S |
| C-6 | 4 | 10% | — | — | — | 50% A |
| C-7 | 1 | Pass | — | — | — | 100% A |
| C-8 | Pass | 10% | — | — | — | 75% A |
| C-9 | Pass | Pass | — | — | — | 15% A |
| C-10 | 20 | Pass | — | — | — | 0 |
| C-11 | 30 | 100% | — | — | — | 0 |
| C-12 | 2.5 | 1% | — | — | — | 5% S |

*Deposit only at the start of the peel

We claim:

1. Pressure-sensitive adhesive tape comprising a backing sheet carrying a layer of pressure-sensitive adhesive comprising a copolymer of monomers comprising
    (a) from 95 to 99.8 parts by weight of at least one terminally unsaturated vinyl monomer, 60 to 100 weight percent of said monomer being selected from the class of nontertiary alkyl acrylates wherein each alkyl group has at least half of its carbon atoms in a single chain and the average length of the alkyl chain is at least 4 and not more than 12, and
    (b) from 0.2 to 5 parts by weight of at least one vinyl-unsaturated homopolymerizable emulsifier monomer which is a surfactant having both a hydrophobic and a hydrophilic moiety, contains at least 5 but not more than 40 carbon atoms, and is water-dispersible,
the total parts by weight of (a) plus (b) being 100, wherein the improvement comprises:
    the layer of pressure-sensitive adhesive comprises 5 to 50% by weight of tackifier resin selected from at least one of (a) hydrogenated rosin ester, (b) polyterpene, (c) polymerized alkyl styrene, and (d) polymerized petroleum-derived monomer resin.

2. Pressure-sensitive adhesive tape as defined in claim 1 wherein the tackifier resin comprises from 10 to 40 percent by weight of said adhesive layer.

3. Pressure-sensitive adhesive tape as defined in claim 1 wherein the amount of emulsifier monomer (b) is from 1 to 4 parts by weight.

4. Pressure-sensitive adhesive tape as defined in claim 3 wherein the emulsifier monomer (b) is a monovalent salt of a styrene sulfonate.

5. Pressure-sensitive adhesive tape as defined in claim 4 wherein the monovalent salt is sodium styrene sulfonate.

6. Pressure-sensitive adhesive tape as defined in claim 3 wherein said monomers are free from zwitterion monomer.

7. Pressure-sensitive adhesive tape as defined in claim 3 wherein the adhesive layer includes a small amount of an external emulsifier.

8. The adhesive of a pressure-sensitive adhesive tape as defined in claim 1.

9. Method of making a pressure-sensitive adhesive tape comprising the steps of
    (1) copolymerizing in water monomers comprising
        (a) from 95 to 99.8 parts by weight of at least one terminally unsaturated vinyl monomer, 60 to 100 weight percent of said monomer being selected from the class of nonteriary alkyl acrylates wherein each alkyl group has at least half of its carbon atoms in a single chain and the average length of the alkyl chain is at least 4 and not more than 12, and
        (b) from 0.2 to 5 parts by weight of a monovalent salt of a styrene sulfonate,
    the total parts of weight of (a) plus (b) being 100, and
    (2) blending into the copolymer latex a dispersion of tackifier resin selected from at least one of (a) hydrogenated rosin ester, (b) polyterpene, (c) polymerized alkyl styrene, and (d) polymerized petroleum-derived monomer resin and in an amount comprising from 5 to 50% by weight of solids in the blend, and
    (3) coating the blend onto the backing sheet to provide a pressure-sensitive adhesive tape.

10. Method as defined in claim 9 wherein the tackifier resin is incorporated into said composition in step (2) prior to copolymerizing step (1).

11. Method as defined in claim 9 wherein the tackifier resin is incorporated into said composition in step (2) subsequent to copolymerizing step (1).

UNITED STATES PATENT AND TRADEMARK OFFICE
CERTIFICATE OF CORRECTION

PATENT NO. : 4,645,711

DATED : February 24, 1987

INVENTOR(S) : Louis E. Winslow. Richard E. Bennett, Thomas S. Overstreet

It is certified that error appears in the above-identified patent and that said Letters Patent is hereby corrected as shown below:

Col. 3, line 38, "becuase" should be -- because --

Col. 6, line 55, "meta-bisulfate" should be -- meta-bisulfite -- line 61, "meta-bisulfate" should be -- meta-bisulfite -- line 63, "meta-bisulfate" should be -- meta-bisulfite --

Col. 9, line 18, "Exammples" should be -- Examples --

Signed and Sealed this

Twenty-fifth Day of August, 1987

Attest:

DONALD J. QUIGG

Attesting Officer     Commissioner of Patents and Trademarks